United States Patent
Robelin et al.

(10) Patent No.: US 9,531,244 B2
(45) Date of Patent: Dec. 27, 2016

(54) CONDUCTED EMISSIONS FILTERS

(71) Applicant: Control Techniques Limited, Newtown (GB)

(72) Inventors: Arnaud Robelin, Anville (FR); Jean-Marc Maurice Petillon, Fleac (FR); Antony John Webster, Montgomery (GB)

(73) Assignee: CONTROL TECHNIQUES LIMITED, Newtown (GB)

( * ) Notice: Subject to any disclaimer, the term of this patent is extended or adjusted under 35 U.S.C. 154(b) by 465 days.

(21) Appl. No.: 14/091,704

(22) Filed: Nov. 27, 2013

(65) Prior Publication Data
US 2014/0145531 A1    May 29, 2014

(30) Foreign Application Priority Data
Nov. 29, 2012    (EP) ..................... 12306486

(51) Int. Cl.
| | |
|---|---|
| *H02K 11/02* | (2016.01) |
| *H02M 1/44* | (2007.01) |
| *H02M 5/44* | (2006.01) |
| *H02M 1/12* | (2006.01) |
| *H02M 1/32* | (2007.01) |

(52) U.S. Cl.
CPC ............ *H02K 11/024* (2013.01); *H02M 1/12* (2013.01); *H02M 1/44* (2013.01); *H02M 5/44* (2013.01); *H02M 2001/327* (2013.01)

(58) Field of Classification Search
CPC .................................................. H02K 11/024
USPC .............................. 318/400.24, 400.01, 700
See application file for complete search history.

(56) References Cited

U.S. PATENT DOCUMENTS

| | | | | |
|---|---|---|---|---|
| 5,220,258 | A * | 6/1993 | Hans ......................... | H02P 6/14 318/400.09 |
| 5,661,390 | A | 8/1997 | Lipo et al. | |
| 6,054,823 | A | 4/2000 | Collings et al. | |
| 6,169,378 | B1 * | 1/2001 | Karwath ................... | H02P 6/34 318/400.09 |
| 6,876,165 | B1 * | 4/2005 | Rappenecker ........... | H02H 3/04 318/400.12 |

FOREIGN PATENT DOCUMENTS

| | | |
|---|---|---|
| CN | 1459904 | 12/2003 |
| CN | 203691222 | 7/2014 |
| EP | 0758161 | 2/1997 |
| EP | 2421131 | 2/2012 |
| GB | 2247999 | 3/1992 |
| WO | 01/03267 | 1/2001 |

* cited by examiner

*Primary Examiner* — David S Luo
(74) *Attorney, Agent, or Firm* — Harness, Dickey & Pierce, P.L.C.

(57) ABSTRACT

Conducting emission suppression in a power circuit for an electric motor comprises a negative temperature co-efficient resistor and capacitor connecting one of the power lines to ground. The NTC resistor is self-stabilizing so that changes in the load current are automatically compensated for.

9 Claims, 2 Drawing Sheets ated patent application No. 12306486.7, filed Nov. 29,
CONDUCTED EMISSIONS FILTERS

CROSS-REFERENCE TO RELATED APPLICATION

This application claims the benefit and priority of European Patent Application No. 12306486.7, filed Nov. 29, 2012. The entire disclosure of the above application is incorporated herein by reference.

FIELD

This invention relates to a conducted emissions filter.

BACKGROUND

In power electronics, for example electric motor drives, it is known that there is a spectrum of radio frequency currents flowing from the drive as a result of circuit operation with high voltages and currents. These are known as conducted emissions and are typically measured in the range of 0.15 to 30 MHz. They emanate principally from the switched rectified DC power driving the motor. Suppression of these emissions is very important. For example, the power cables to the motor are shielded to avoid interference with operation of nearby equipment. It is also known to suppress such emissions from the upstream power electronics by installing a capacitor to earth the high frequency emissions. However, both the inherent capacitance of the power lines in the installed capacitance gives rise to resonance and, therefore, peaks in emissions that are particularly acute. In theory it is possible to damp these by installing a resistance in the power line. However, this proves to be impracticable particularly for installations with long runs of power cabling to the motor, as the resistance would have to be very highly rated to handle the expected power dissipation and avoid the risk of fire. In addition, deciding on the size and rating of such a resistor would, in large part, be dependent on the length of the cable run from the power electronics to the motor. As this is application specific, it is not a remedy that can be effected during manufacture of the drive unless the individual installation details for the motor are known.

SUMMARY

Disclosed embodiments provide a control circuit including damping for conducted emissions comprising a power electronics circuit having power lines and a negative temperature co-efficient (NTC) resistor earthing at least one of the power lines. The NTC resistor counteracts the overheating by reducing its resistance as the emissions being suppressed rise. This lowers the power rating of the NTC resistor and self-protects against the fire risk of the component overheating in the presence of long cable runs and/or high switching frequencies.

Preferably, the NTC resistor is connected to earth in series with a capacitor. The NTC resistor may be connected to the or each phase of an AC supply that is rectified to provide the power across the power rails of a DC link. The combination acts as a series damping filter for suppressing the conducted emissions which is thermally self-regulating depending on the magnitude of the emissions.

The NTC resistor may be arranged with an inductance connected across it to shunt the high frequency current in the NTC. The inductance reduces the power dissipation in the NTC resistor by shunting the low frequency components away from the NTC resistor.

DRAWINGS

Embodiments will now be described with reference to the accompanying drawings in which.

DETAILED DESCRIPTION

Figure 1:
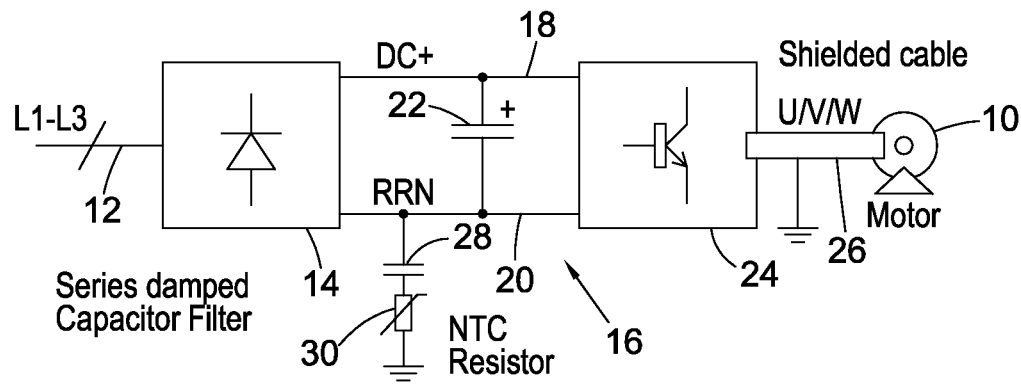
FIG. 1 is a circuit diagram of a power electronic circuit with DC damping.

Referring to FIG. 1, a power electronics circuit for driving an electric motor 10 comprises a three-phase AC input 12 to a rectifier circuit 14 for the or each phase of the motor 10. The rectified output of the rectifier circuit 14 is connected to a DC link 16 comprising DC power rails 18 and 20 across which is a DC link capacitor 22. The skilled person will appreciate that the rectifier can take many forms. For example a typical circuit for use is providing power to a brushless DC motor, or other DC machine, is a full wave rectified bridge rectifier. Likewise, while a multi-phase AC supply is shown, it may equally well be single phase AC.

The DC link rails 18 and 20 are connected to a power switching circuit 24 which provides power to the motor 10. The power cables 26 are shown shielded to suppress radiated emissions from the power electronics circuit and the motor. The rectifier circuit 14 and the power switching circuit 24 are shown schematically. The skilled person will be aware of the forms the power electronics and the available circuit configurations can take for single and multiphase electric motors. The motor can also be of various forms.

Figure 2:
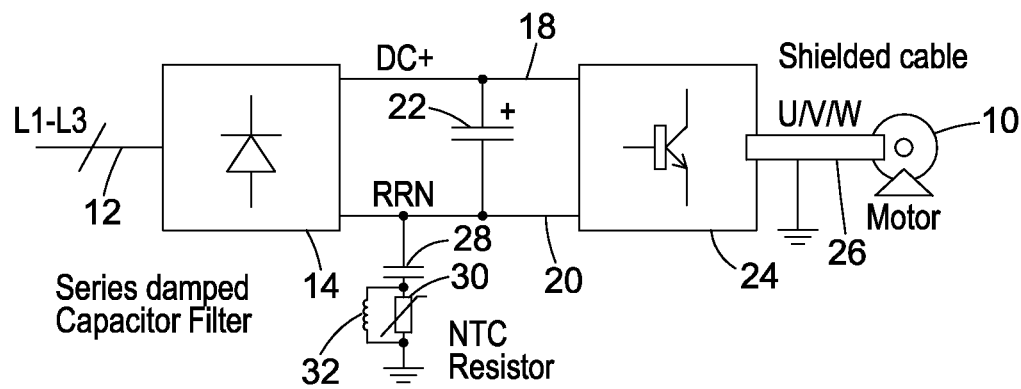
FIGS. 2-6 are circuit diagrams of power electronics circuits with variants of the use of the NTC damping filter in FIG. 1.
Figure 3:
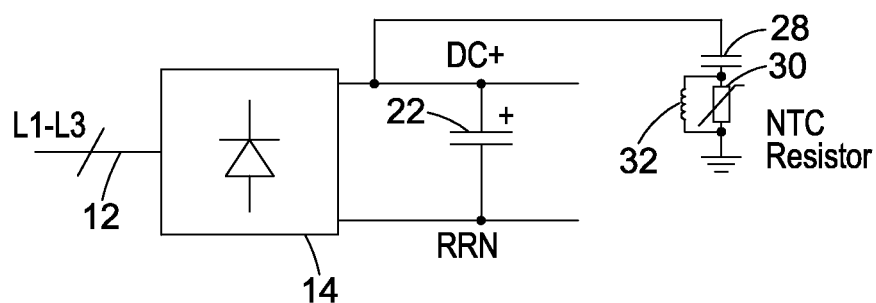

Turning to the DC link, a capacitor 28 is connected to the lower power rail 20 and this is connected to earth in series with a negative temperature coefficient (NTC) resistor 30. In the circuit of FIG. 2, an inductor 32 is connected in parallel with the NTC resistor. The capacitor/resistor pair form a series damping filter for suppressing the conducted emissions.

Using switching frequencies of the order of 600 Hz-16 kHz, emissions are generated by the power electronic circuits as described. The NTC resistor in the filter is self protecting. As the current flowing to earth through the filtering capacitor increases, the NTC resistor heats up and the resistance of the NTC resistor decreases, thereby enabling it to stay within its power rating as the magnitude of the noise currents and emissions increases. The equivalent fixed resistor in the current circuit would have to be much larger and, therefore, more expensive if it is to be sufficient to cope with the anticipated power. The inductance is small—of the order of micro Henrys—across the NTC resistor. It acts as a shunt to divert high frequency current to reduce the power dissipation in the NTC resistor. This does not directly affect the conducted emissions but it does assist by damping the resonance when using an NTC resistor with a lower current rating and/or power rating. This enables the NTC resistor to be smaller in size and cost than would otherwise be the case.

Figure 4:
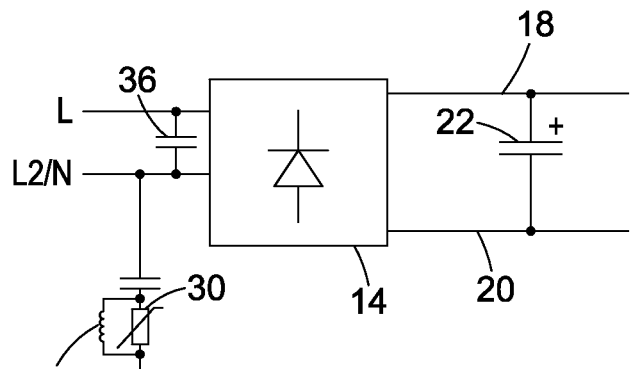
Figure 5:
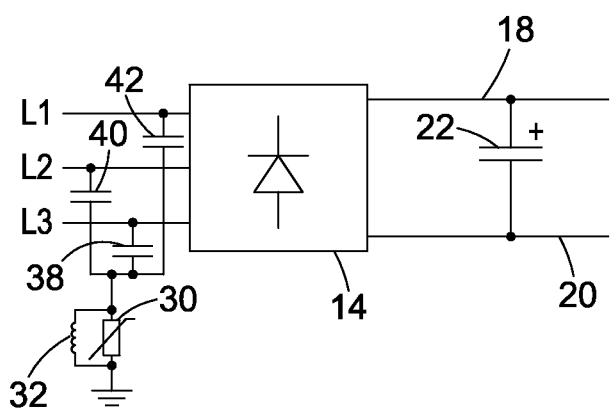
Figure 6:
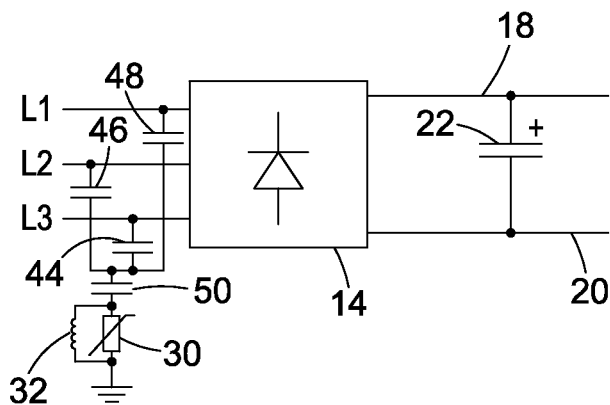

FIGS. 3-6 illustrate alternative locations for the NTC damped filter circuit. As can be seen from FIG. 3, it can be installed on either of the DC rails. It can also be installed on the AC side of the rectifier shown in FIGS. 4-6. In each case the NTC resistor is preferably connected in series with at least one capacitor per rail to which the NTC is connected. In the circuit of FIG. 4, the supply is single phase AC live to earth. A capacitor 34 is connected in series with the NTC resistor 30 which is shunted by the inductor 32. There is a second capacitor 36 connecting the two phase lines L1 and L2/N to sink the conducted emissions to earth. In the circuit of FIG. 5, the three-phase star connected supply L1, L2, L3 each has capacitors 38, 40 and 42 respectively connected to earth in series with the NTC resistor 30 which is shunted by the inductor 32. In all cases, the principle is the same—the NTC resistor and the capacitance form a self adjusting damping filter for conducted emissions. FIG. 6 is a circuit similar to that in FIG. 5. Capacitors 44, 46, and 48 connected in parallel to the NTC resistor 30 are supplemented by a capacitor 50 which is in series with the NTC resistor. In all cases, the series damping filter constituted by the capacitance and the NTC resistor serve to damp the resonance of the conducted emissions while automatically adjusting against excessive losses and/or a fire risk by the negative temperature coefficient of the resistive element.

The invention claimed is:

1. A power circuit for an electrical machine, the power circuit comprising power conductors for providing electrical power for the machine and a filter to dampen conducted emissions, the filter comprising a negative temperature coefficient (NTC) resistor connecting at least one of the power conductors to ground and an inductance connected in parallel with the NTC resistor such that a voltage across the NTC resistor and a voltage across the inductance are substantially the same.

2. A circuit as claimed in claim 1 in which the NTC resistor is connected in series with a capacitor to ground.

3. A circuit as claimed in claim 1 in which the NTC resistor is connected to a DC power rail.

4. A circuit as claimed in claim 1 comprising a rectifier circuit having AC supply rails and being connected to a DC link, the NTC resistor being connected to a phase of the AC supply.

5. A circuit as claimed in claim 4 in which the AC supply rails provide a single phase AC supply, a second capacitor being connected between the AC supply rails.

6. A circuit as claimed in claim 4 in which the AC supply rails provide a multiphase AC supply, a second capacitor being connected from each AC supply rail to the NTC resistor in parallel.

7. A circuit as claimed in claim 6 in which a further capacitor is connected in series with the NTC resistor.

8. A system comprising an electrical machine and the power circuit of claim 1 connected to the electrical machine.

9. The system of claim 8 wherein the electrical machine includes an electric motor.

* * * * *